(12) United States Patent
Dinnebier et al.

(10) Patent No.: US 12,036,950 B2
(45) Date of Patent: Jul. 16, 2024

(54) SHELF UNIT

(71) Applicant: Bayerische Motoren Werke Aktiengesellschaft, Munich (DE)

(72) Inventors: Martin Dinnebier, Dachau (DE); Walter Fleischer, Neufahrn b. Freising (DE); Daniel Hosta, Munich (DE); Nima Monzavi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 207 days.

(21) Appl. No.: 17/771,534

(22) PCT Filed: Oct. 15, 2020

(86) PCT No.: PCT/EP2020/078998
§ 371 (c)(1),
(2) Date: Apr. 25, 2022

(87) PCT Pub. No.: WO2021/089287
PCT Pub. Date: May 14, 2021

(65) Prior Publication Data
US 2022/0410808 A1    Dec. 29, 2022

(30) Foreign Application Priority Data
Nov. 8, 2019    (DE) .................... 10 2019 130 140.8

(51) Int. Cl.
*B60R 5/04*    (2006.01)
(52) U.S. Cl.
CPC .................................. *B60R 5/044* (2013.01)
(58) Field of Classification Search
CPC ......... B60R 5/044; B60R 5/045; B60R 5/042; B60N 3/001; A47B 31/06
USPC ........................................................... 108/44
See application file for complete search history.

(56) References Cited

U.S. PATENT DOCUMENTS

| 5,970,884 | A | 10/1999 | Taille et al. | |
| 2009/0015030 | A1* | 1/2009 | Hofmann | B60R 5/044 |
| | | | | 296/37.16 |
| 2010/0127526 | A1* | 5/2010 | Decorme | B60R 5/044 |
| | | | | 296/37.16 |

(Continued)

FOREIGN PATENT DOCUMENTS

| CN | 1181730 A | 5/1998 |
| CN | 101108602 A | 1/2008 |

(Continued)

OTHER PUBLICATIONS

International Search Report (PCT/ISA/210) issued in PCT Application No. PCT/EP2020/078998 dated Nov. 20, 2020 with English translation (four (4) pages).

(Continued)

*Primary Examiner* — Jose V Chen
(74) *Attorney, Agent, or Firm* — Crowell & Moring LLP

(57) ABSTRACT

A shelf unit for covering a storage or luggage compartment in a motor vehicle includes a shelf which is pivotally mounted on at least one receptacle so as to pivot between a position that covers the storage or luggage compartment and a position in which the storage or luggage compartment is accessible. The receptacle has a slot or guide gate along which the shelf can be pivoted. A vehicle includes the shelf unit.

14 Claims, 4 Drawing Sheets

(56) References Cited

U.S. PATENT DOCUMENTS

| | | | | |
|---|---|---|---|---|
| 2012/0133171 | A1* | 5/2012 | Honda | B60R 5/044 |
| | | | | 296/37.16 |
| 2018/0154836 | A1* | 6/2018 | Herman | B60R 5/044 |
| 2018/0162292 | A1* | 6/2018 | Wertich | B62D 43/06 |
| 2019/0084484 | A1* | 3/2019 | Herman | B60R 5/04 |
| 2019/0161016 | A1* | 5/2019 | Choi | B60R 5/045 |
| 2019/0168675 | A1* | 6/2019 | Jeunesse | B60R 5/044 |
| 2020/0011107 | A1* | 1/2020 | Lecomte | E05D 15/0608 |
| 2020/0237092 | A1* | 7/2020 | Paindavoine | B60N 3/002 |
| 2020/0377023 | A1* | 12/2020 | Thompson | B60R 13/0823 |
| 2023/0234513 | A1* | 7/2023 | Ye | B60R 13/0243 |
| | | | | 296/146.7 |
| 2023/0373414 | A1* | 11/2023 | Brillon | H01R 35/04 |

FOREIGN PATENT DOCUMENTS

| | | | |
|---|---|---|---|
| CN | 104228691 A | 12/2014 | |
| CN | 104670101 A | 6/2015 | |
| CN | 107921911 A | 4/2018 | |
| DE | 696 05 905 T2 | 7/2000 | |
| DE | 60 2005 006 216 T2 | 6/2009 | |
| DE | 10 2011 087 351 A1 | 5/2012 | |
| DE | 10 2015 215 181 A1 | 2/2017 | |
| EP | 1 655 175 A1 | 5/2006 | |
| EP | 1 880 902 A1 | 1/2008 | |
| FR | 2 887 201 A1 | 12/2006 | |
| JP | 2013023142 A * | 2/2013 | B60R 5/044 |
| JP | 2014028566 A * | 2/2014 | B60R 5/044 |
| WO | WO-9632301 A1 * | 10/1996 | B60R 5/044 |
| WO | WO 2006/134295 A2 | 12/2006 | |

OTHER PUBLICATIONS

German-language Written Opinion (PCT/ISA/237) issued in PCT Application No. PCT/EP2020/078998 dated Nov. 20, 2020 (five (5) pages).

German-language Search Report issued in German Application No. 10 2019 130 140.8 dated Jun. 30, 2021 with partial English translation (10 pages).

English translation of Chinese-language Office Action issued in Chinese Application No. 202080074974.8 dated Oct. 12, 2023 (6 pages).

English translation of Chinese-language Office Action issued in Chinese Application No. 202080074974.8 dated May 27, 2023 (7 pages).

* cited by examiner

SHELF UNIT

BACKGROUND AND SUMMARY

The invention relates to a shelf unit for covering a storage or baggage space. The present invention relates in particular to a vehicle which includes the shelf unit.

Shelf units for covering storage or baggage spaces are known from the prior art. A shelf which by way of latching hinges is mounted so as to be pivotable on a receptacle is disclosed in DE 10 2015 215 181 A1.

It is an object of the present invention to provide a shelf unit for covering a storage or baggage space which envisages simple handling by a user, has a small number of individual parts, and is able to be produced in a cost-effective manner.

To this end, the shelf unit according to the invention for covering a storage or baggage space has a shelf. At least one receptacle on which the shelf is pivotably mounted is provided here. The shelf here is pivotable between a position covering the storage or baggage space, and a position providing access to the storage or baggage space, wherein the receptacle has a guide gate along which the shelf is pivotable. As a result, the shelf in the receptacle can be pivoted between the covering position and the position providing access to the storage or baggage space in a particularly simple manner. Because the shelf has only to be pivoted along the guide gate of the receptacle in order to change between the aforementioned positions of the shelf, a particularly lightweight construction mode of the shelf is possible, as a result of which the ease of handling by a user is advantageously simplified. Because the receptacle does not have to have any complicated and large hinges, the number of components and an installation size of the receptacle can be reduced.

The shelf unit can advantageously have at least one latching arm which is connected to the shelf. Alternatively, the latching arm can also be formed so as to be integral to the shelf. The latching arm when pivoting the shelf moves along the guide gate. As a result, the shelf can be more easily pivoted and wear on the shelf can be minimized.

The guide gate can preferably have at least one recess, in particular a plurality of recesses, which is/are specified for receiving and locking the shelf, in particular the latching arm. This means that the recesses of the guide gate are configured such that the shelf or the latching arm can be at least partially introduced into these recesses. As a result, the shelf when pivoting between the aforementioned positions can be locked in the latter and/or further predetermined positions which correspond to positions of the recesses on the guide gate.

One of the aforementioned recesses can advantageously be an upper recess which is specified for locking the shelf, in particular the latching arm, in the covering position. Furthermore, one of the aforementioned recesses can advantageously be a lower recess which is specified for locking the shelf, in particular the latching arm in the position providing access to the storage or baggage space. As a result, the shelf can be locked in the position providing access to the storage or baggage space, for example, so that a user can load the storage or baggage space without having to keep hold of the shelf in the process. In that the shelf by way of the lower recess of the guide gate can be locked in the covering position, objects to be stowed, such as baggage items, for instance, can be safely stored in the storage or baggage space without the storage or baggage space being inadvertently opened.

The latching arm can preferably have a spring portion which cushions the shelf in relation to the guide gate. Handling of the shelf can advantageously be simplified as a result. It can in particular be prevented as a result that the latching arm and/or the connection between the latching arm and the shelf is broken.

The latching arm advantageously has slots, and the guide gate has ribs which can engage in the slots of the latching arm. It can be prevented as a result that the latching arm shifts perpendicularly to a direction of extent of the guide gate.

Advantageously, the storage or baggage space on a side opposite the receptacle can have a loading sill. This means that the loading sill in a plan view of the storage or baggage space can be disposed opposite the receptacle. In the covering position of the shelf, a tension force, or a spring force, respectively, of the spring portion of the latching arm can push the shelf in the direction of the loading sill. As a result, a joint between the shelf and the loading sill can advantageously be closed. This has the advantages that the aesthetic appeal of the shelf unit is enhanced and that less dust and dirt can make its way into the storage or baggage space.

It is particularly advantageous for the receptacle to have a support element on which the shelf partially bears. A lever between ends of the shelf is thus generated, the user being able to pivot the shelf particularly easily between the aforementioned positions as a result.

The support element of the receptacle can advantageously have a first support face on which the shelf in the covering position can partially bear, and a second support face on which the shelf in the position providing access to the storage or baggage space can partially bear. As a result, the stability of the locking mechanism of the shelf, in particular in the position providing access to the storage or baggage space, can advantageously be increased.

It is particularly advantageous for the receptacle to have a cladding which at least partially covers the guide gate of the receptacle and/or the latching arm of the shelf. An aesthetic appeal of the shelf unit can thus be enhanced, providing the additional effect that less dust and dirt can make its way into the receptacle, in particular into the guide gate.

An upper side of the shelf can advantageously have a step. The cladding of the receptacle here can be configured so as to correspond to the step. As a result, a particularly high-end aesthetic appeal of the shelf unit can be achieved.

It is particularly preferable for the shelf to be retrievable from the receptacle. As a result of the shelf being retrievable, the storage or baggage space can be more accessible. In particular, comparatively large objects and/or baggage items can be stowed in the storage or baggage space as a result.

The latching arm of the shelf unit can advantageously be produced, in particular stamped, from metal, in particular from a metal sheet, and/or a plastics material, for example. For example, the latching arm can be adhesively bonded and/or screwed to the shelf. The shelf can be produced from metal, plastics material and/or wood, for example. The shelf can be covered with a fabric such as felt and/or with leather, for example. The cladding of the receptacle can be formed from fabric and/or leather, for example. Alternatively, the cladding of the receptacle can be from plastics material and/or metal with a fabric and/or leather covering. In particular, the cladding can be covered with the same fabric as the shelf.

The present invention moreover relates to a vehicle which includes at least one shelf unit according to the invention for covering a storage or baggage space of the vehicle.

The shelf unit here can be used for covering a spare wheel well of a trunk, for example. Alternatively or additionally, the shelf unit can of course also be used for covering a storage compartment in a central console and/or an armrest of the vehicle. When used as a cover of a storage compartment of a central console or armrest, the loading sill of the storage or baggage space corresponds to a cladding of the storage compartment of the central console or of the armrest. The shelf here can advantageously be covered with a fabric or leather in order to provide a comfortable arm support.

Further details, features and advantages of the invention are derived from the description hereunder and the figures.

DETAILED DESCRIPTION OF THE DRAWINGS

Figure 1:
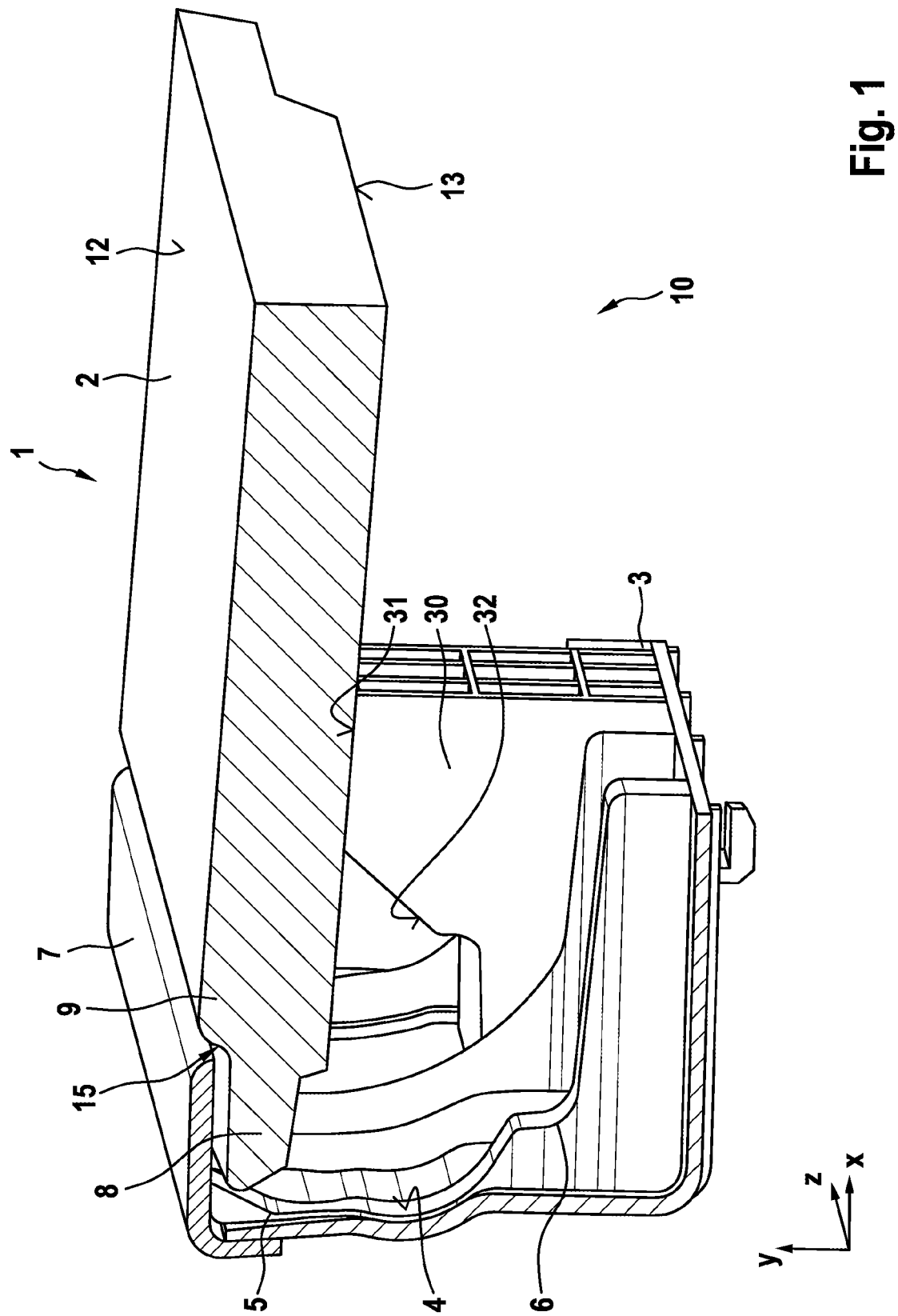
FIG. 1 is a perspective lateral sectional view of the shelf unit according to a first embodiment of the present invention.

FIG. 1 shows a perspective lateral sectional view of the shelf unit 1 according to a first embodiment of the present invention. The shelf unit 1 here has a shelf 2. Moreover, a receptacle 3 is provided in which the shelf 2 is mounted. The shelf 2 here covers a storage or baggage space 10.

The receptacle 3 has a support element 30 on which the shelf 2 partially bears.

The receptacle 3 moreover has a substantially semicircular guide gate 4 on which the shelf 2 is pivotable. When pivoting the shelf 2, the latter shifts or slides along the guide gate 4. The shelf 2 here can be pivoted between an open position in which the storage or baggage space 10 is accessible (cf. also FIG. 3) and a closed position which is illustrated in FIG. 1 and in which the storage or baggage space 10 is covered.

The support element 30 comprises a first support face 31 on which the shelf 2 in the closed position partially bears. The support element 30 furthermore comprises a second support face 32 which is angled in relation to the first support face 31 and on which the shelf 2 in the opened position partially bears.

The guide gate 4 moreover has two recesses 5, 6 which are specified for receiving and locking the shelf 2. One recess 5 here is disposed at the top in the guide gate 4. The upper recess 5 is disposed such that this upper recess 5 receives and locks the shelf 2 in a closed position. In other words, the storage or baggage space 10 is covered when the shelf 2 is introduced into the upper recess 5 of the guide gate 4, or by way of the guide gate 4 is shifted into the upper recess 5, respectively. A further recess 6 is disposed at the bottom in the guide gate 4. The lower recess 6 here is disposed such that the lower recess 6 locks the shelf 2 in an opened position (cf. also FIG. 3). This means that the storage or baggage space 10 is opened when the shelf 2 is introduced into the lower recess 6.

The receptacle 3 moreover has a cladding 7 which at least partially covers the guide gate 4, or an end of the shelf 2, respectively. For example, the cladding 7 in the covering position of the shelf 2 can at least partially overlap the shelf 2. The cladding 7 here can in particular be flexible so that the cladding 7 does not obstruct any pivoting of the shelf 2.

The shelf 2 moreover has a step 15. This means that the shelf 2 can have a stepped surface which forms a lower shoulder 8 and an upper shoulder 9. The cladding 7 is configured so as to correspond to the step 15. The cladding 7 here protrudes from the receptacle 3, or an upper edge of the receptacle 3, respectively, to the step 15 between the lower shoulder 8 and the upper shoulder 9. The thickness of the cladding 7 here corresponds to the height of the step 15 between the lower shoulder 8 and the upper shoulder 9 so that a surface of the upper shoulder 9 and a surface of the cladding 7 in the closed position of the shelf 2 form a planar surface. As a result, the guide gate 4, or the entire receptacle 3, respectively, can be covered in a closed position of the shelf 2.

The shelf 2 here is retrievable from the receptacle 3. To this end, the shelf 2 can be at least partially pivoted to the opened position and extracted from the receptacle 3. In order for the shelf 2 to be introduced, the shelf 2 in any arbitrary position between the covering position and the position providing access to the storage or baggage space 10 can be introduced and pivoted into the receptable 3 up to the guide gate 4. In particular, the shelf 2 can be introduced into the receptacle 3 and locked on a recess 5, 6 of the guide gate 4 in the process.

The support element 3 and the guide gate 4 are advantageously formed so as to be integral; a particularly cost-effective and simple production of the support element 3 and the guide gate 4 being enabled as a result.

Figure 2:
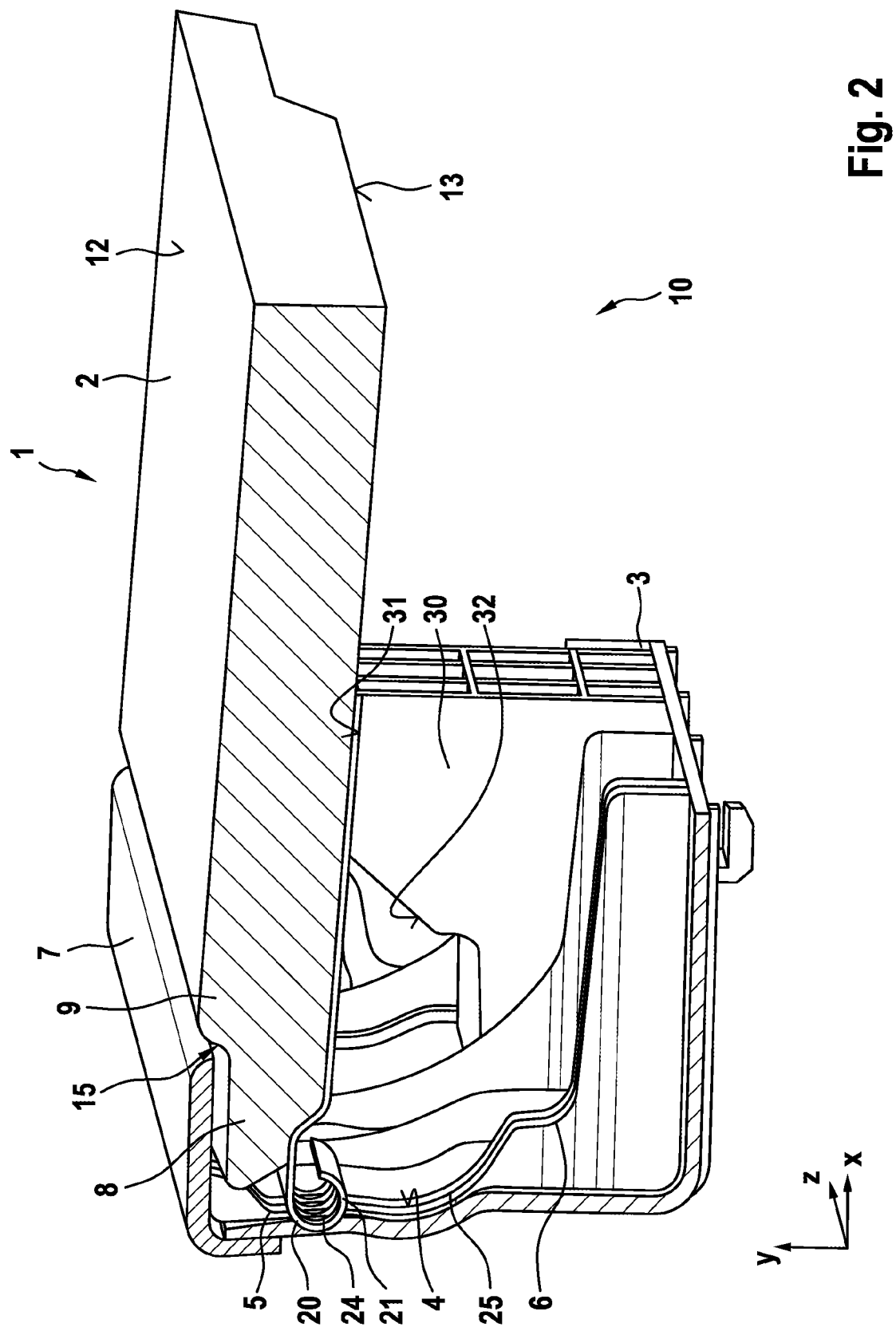
FIG. 2 is a perspective lateral sectional view of the shelf unit according to a second embodiment of the present invention.
Figure 3:
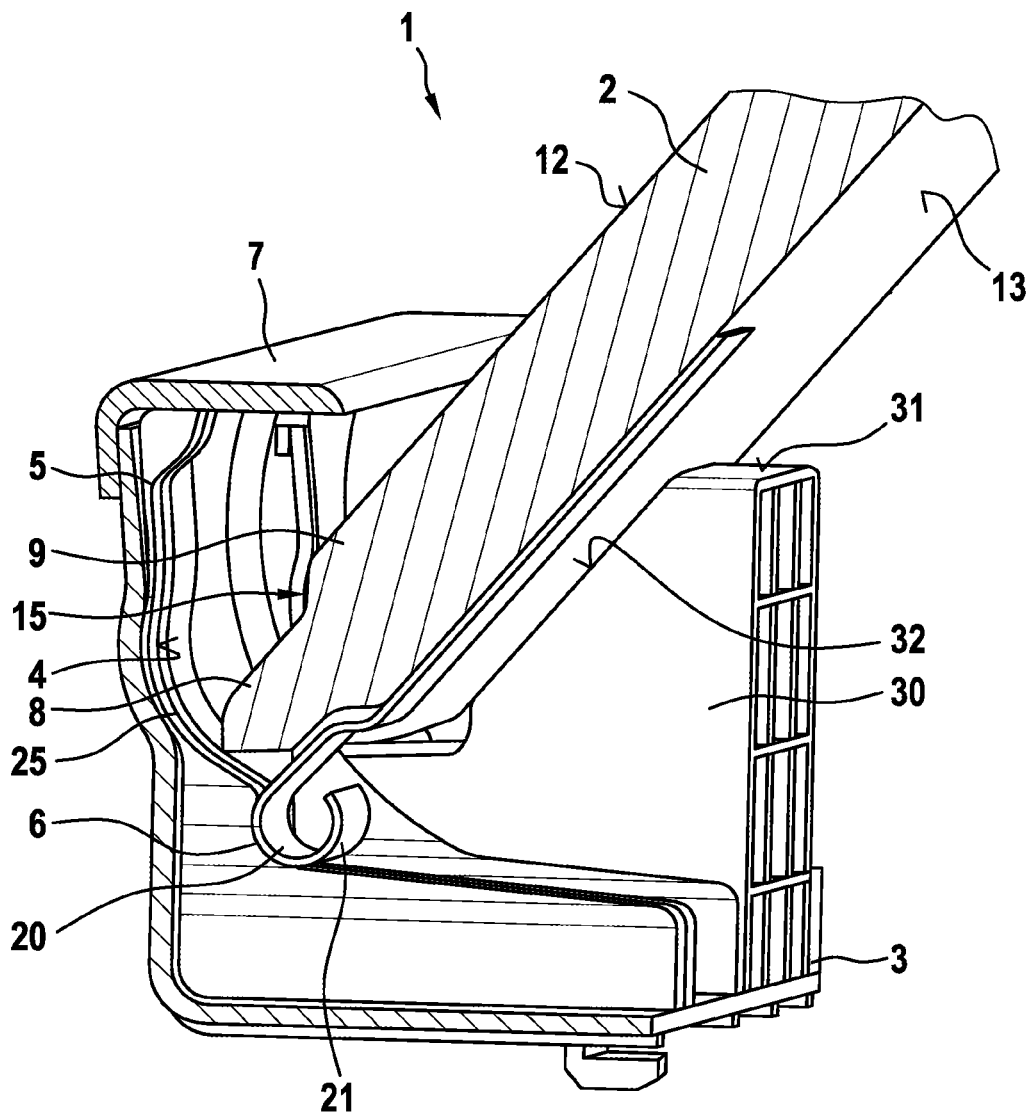
FIG. 3 is a perspective lateral sectional view of the shelf unit according to the second embodiment of the present invention.

FIGS. 2 and 3 show a perspective lateral sectional view of the shelf unit 1 according to a second embodiment of the present invention. FIG. 2 here shows the closed position of the shelf 2, and FIG. 3 shows the opened position of the shelf 2 according to the second embodiment of the present invention.

As opposed to the first embodiment, the shelf unit 1 according to the second embodiment of the present invention has a latching arm 20 which shifts or slides on the guide gate. The latching arm 20 here is disposed on and fastened to part of a lower side 13 of that end of the shelf 2 that is mounted on the receptacle 3.

The latching arm 20 according to this embodiment of the present invention has a spring portion 21 which, when pivoting the shelf 2, shifts or slides along the guide gate 4. To this end, the latching arm 20, in particular the spring portion 21, can have slots 24 in which ribs 25 of the guide gate 4 can engage, as a result of which a lateral stability, thus a stability in the Z-direction of the latching arm 20 on the guide gate 4, can be increased.

Alternatively or additionally to the spring portion 21, the latching arm 20 can have a wheel which is not illustrated and rolls along the guide gate 4. The spring portion 21 here, for example in the form of a spring, can be disposed between the wheel and that portion of the latching arm 20 that is connected to the shelf 2. Any friction between the latching arm 20 and the guide gate 4 can be minimized as a result.

In the closed position illustrated in FIG. 2, the latching arm 20 is introduced in the upper recess 5, as a result of which the shelf 2 connected to the latching arm 20 is locked in the closed position. In the opened position illustrated in FIG. 3, the latching arm 20 is introduced in the lower recess 6, as a result of which the shelf 2 connected to the latching arm 20 is locked in the opened position.

The spring portion 21 can be temporarily deformed or compressed under pressure. As a result, the latching arm 20 yields when a user of the shelf unit 2 exerts pressure on the latching arm 20 along the direction of extent of the guide gate 4, thus the Y-direction in FIGS. 1 to 4. This pressure can be exerted in that, for example, the shelf 2 is pivoted between the opened and the closed position. This means that when the latching arm 20 is introduced into the upper recess 5 and locks the shelf 2 in the closed position, for example, the user by overcoming a spring force of the spring portion 21 can retrieve the latching arm 20 from the recess 5 again and pivot the latching arm 20 along the guide gate 4.

The resistance by way of which the latching arm 20, or the shelf 2 is locked in the closed or opened position, can be adjusted by tuning the spring force of the spring portion 21 and/or the depth of the recesses 5, 6.

As can moreover be derived from FIG. 3, the latching arm 20 is disposed on the lower side 13 of the shelf 2 in such a manner that the latching arm 20 in a Z-direction is spaced apart from the second support face 32. It can be prevented as a result that the latching arm 20 catches on the receptacle 3 when the shelf 2 is being retrieved.

Figure 4:
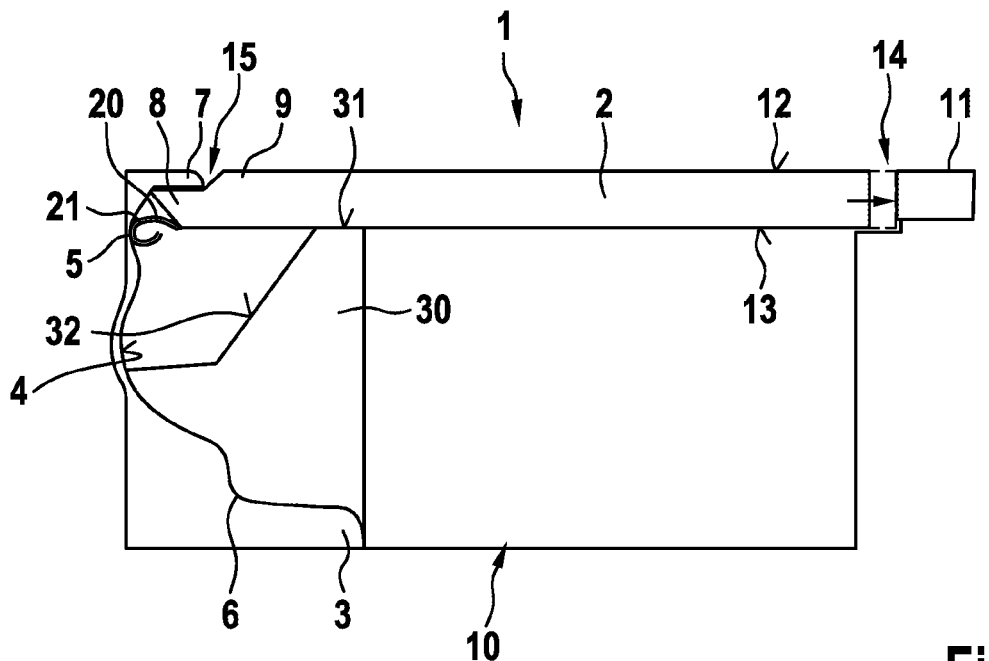
FIG. 4 is a lateral sectional view of the shelf unit according to the second embodiment of the present invention.

FIG. 4 shows a lateral sectional view of the shelf unit 1 according to the second embodiment of the present invention. As can be derived from FIG. 4, the storage or baggage space 10 which is covered by the shelf unit can have a loading sill 11. The loading sill 11 of the storage or baggage space 10 here in the X-direction is disposed opposite the receptacle 3. The shelf 2 is illustrated in the closed position, thus in the position covering the storage or baggage space.

In that the latching arm 20 according to the second embodiment of the present invention has the spring portion 21 which exerts a tension force in the X-direction, the shelf 2 by way of this tension force can be pushed in the X-direction toward the loading sill 11, as a result of which a joint 14 between the loading sill 11 and the shelf 2 is at least partially closed. In particular, the shelf 2 can be pushed against the face below the loading sill 11, or against the loading sill 11, respectively, in the process. This is illustrated by the dashed line in FIG. 4. The tension force of the spring portion 21 can be overcome by pushing the shelf 2 in the opposite direction (X-direction), this enabling pivoting of the shelf 2 and opening of the storage or baggage space 10.

Figure 5:
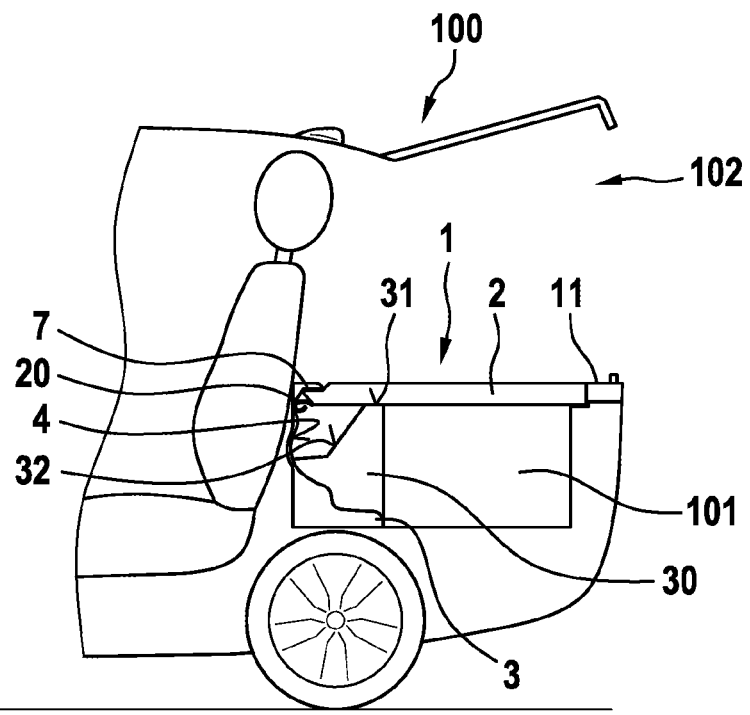
FIG. 5 is a lateral sectional view of a vehicle equipped with the shelf unit.

FIG. 5 shows a lateral sectional view of a vehicle 100. The vehicle 100 includes the shelf unit 1 and a storage or baggage space 101 which can be covered by the shelf unit 1. By way of example, the storage or baggage space 101 in this exemplary embodiment is a spare wheel well 101 of the vehicle 100. The spare wheel well 101 is disposed in a trunk 102 of the vehicle 100.

A user of the vehicle 100 here can pivot the shelf 2 to an opened position in which the spare wheel well 101 is accessible, and can load baggage, tools and/or a spare wheel into the spare wheel well 101 and retrieve baggage, tools and/or a spare wheel from the spare wheel well 101, for example. The spare wheel well 101 moreover has the loading sill 11, the latter being able to prevent scratching of the vehicle 100 when loading the spare wheel well 101.

In that the vehicle 100 includes the shelf unit 1, particularly simple loading of the spare wheel well 101 and a high-end aesthetic appeal of the trunk 102 can be guaranteed.

LIST OF REFERENCE SIGNS

1 Shelf unit
2 Shelf
3 Receptacle
4 Guide gate
5 Upper recess
6 Lower recess
7 Cladding
8 Lower shoulder of the shelf
9 Upper shoulder of the shelf
10 Storage or baggage space
11 Loading sill
12 Upper side of shelf
13 Lower side of shelf
14 Joint between the shelf and the loading sill
15 Step
20 Latching arm
21 Spring portion of the latching arm
22 First end portion of the latching arm
23 Second end portion of the latching arm
24 Slots of the latching arm
25 Ribs of the guide gate
30 Support element
31 First support face
32 Second support face
100 Vehicle
101 Spare wheel well
102 Trunk

The invention claimed is:

1. A shelf unit for covering a storage or luggage space in a motor vehicle, comprising:
   a shelf, and
   a receptacle having a guide gate along which the shelf is pivotable, wherein
      the shelf is mounted so as to be pivotable along the guide gate of the receptacle between a covering position covering the storage or baggage space and a position providing access to the storage or baggage space,
      the receptacle has a support element on which the shelf partially bears, and
      the support element has a first support face on which the shelf in the covering position partially bears, and a second support face angled in relation to the first support face and on which the shelf in the position providing access to the storage or baggage space partially bears.

2. The shelf unit according to claim 1, further comprising:
   at least one latching arm which is connected to the shelf and, when pivoting the shelf, moves along the guide gate.

3. The shelf unit according to claim 2, wherein
   the guide gate has at least one recess which is configured for receiving and locking a position of the latching arm.

4. The shelf unit according to claim 3, wherein
   an upper recess is configured for locking the position of the latching arm in the covering position, and a lower recess is configured for locking the position of the latching arm in the position providing access to the storage or baggage space.

5. The shelf unit according to claim 2, wherein
   the latching arm has a spring portion which cushions the shelf in relation to the guide gate.

6. The shelf unit according to claim 5, wherein
   the storage or baggage space on a side opposite the receptacle has a loading sill, and
   a tension force of the spring portion of the latching arm pushes the shelf in the covering position in the direction of the loading sill.

7. The shelf unit according to claim 2, wherein
the receptacle has a cladding which at least partially covers the guide gate of the receptacle and/or the latching arm of the shelf.

8. The shelf unit according to claim 7, wherein
an upper side of the shelf has a step and the cladding is configured so as to correspond to the step.

9. The shelf unit according to claim 1, wherein
the guide gate has at least one recess which is configured for receiving and locking a position of the shelf.

10. The shelf unit according to claim 1, wherein
the receptacle has a cladding which at least partially covers the guide gate of the receptacle.

11. The shelf unit according to claim 10, wherein
an upper side of the shelf has a step and the cladding is configured so as to correspond to the step.

12. The shelf unit according to claim 1, wherein the shelf is retrievable from the receptacle.

13. A vehicle comprising at least one shelf unit according to claim 1.

14. A shelf unit for covering a storage or luggage space in a motor vehicle, comprising:
a shelf,
a receptacle having a guide gate along which the shelf is pivotable, wherein the shelf is mounted so as to be pivotable along the guide gate of the receptacle between a covering position covering the storage or baggage space and a position providing access to the storage or baggage space,
at least one latching arm which is connected to the shelf and, when pivoting the shelf, moves along the guide gate, wherein
the latching arm has slots, and
the guide gate has ribs, wherein the ribs engage in the slots of the latching arm.

* * * * *